United States Patent
Jang et al.

(10) Patent No.: US 8,154,838 B2
(45) Date of Patent: Apr. 10, 2012

(54) PTC DEVICE, PROTECTIVE CIRCUIT MODULE INCLUDING THE SAME, AND SECONDARY BATTERY INCLUDING THE PROTECTIVE CIRCUIT MODULE

(75) Inventors: Youngcheol Jang, Yongin-si (KR); Kyungwon Seo, Yongin-si (KR); Jeongdeok Byun, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 957 days.

(21) Appl. No.: 12/145,819

(22) Filed: Jun. 25, 2008

(65) Prior Publication Data

US 2009/0122455 A1  May 14, 2009

(30) Foreign Application Priority Data

Nov. 8, 2007 (KR) .................. 10-2007-0113642

(51) Int. Cl.
  *H02H 5/00* (2006.01)
(52) U.S. Cl. ..................................... 361/103
(58) Field of Classification Search ............. 361/103
  See application file for complete search history.

(56) References Cited

U.S. PATENT DOCUMENTS

| 4,635,026 | A | * | 1/1987 | Takeuchi | 338/22 SD |
| 7,817,009 | B2 | * | 10/2010 | Wang et al. | 338/25 |
| 7,892,392 | B2 | * | 2/2011 | Wang et al. | 156/309.3 |

FOREIGN PATENT DOCUMENTS

| CN | 1630918 A | 6/2005 |
| JP | 1998-214616 B | 8/1998 |
| KR | 1999-36224 | 5/1999 |
| KR | 10-0689574 B1 | 11/2002 |
| KR | 10-2004-0110598 | 12/2004 |
| KR | 2004-110598 | 12/2004 |
| KR | 10-2005-0073772 | 7/2005 |
| KR | 10-0673682 B | 1/2007 |

OTHER PUBLICATIONS

Abstract of WO 1997-6538.
Office Action dated Jul. 30, 2010 of corresponding Chinese Patent Application No. 200810211413.9 with its English translation—19 pages.

* cited by examiner

*Primary Examiner* — Stephen W Jackson
(74) *Attorney, Agent, or Firm* — Knobbe Martens Olson & Bear LLP

(57) ABSTRACT

A Positive Temperature Coefficient (PTC) device, a Protective Circuit Module (PCM) including the PTC device, and a secondary battery including the Protective Circuit Module (PCM) are provided. A support portion is formed at one end of a conductive plate of the PTC device, a conductive layer disposed on the upper portion of the PTC main body is fixed to the Protective Circuit Module (PCM), and the support portion is fixed by a coated adhesive that is melted at a high temperature and then hardens when the high temperature is removed, thereby preventing the PTC device from swaying or twisting.

16 Claims, 5 Drawing Sheets

PTC DEVICE, PROTECTIVE CIRCUIT MODULE INCLUDING THE SAME, AND SECONDARY BATTERY INCLUDING THE PROTECTIVE CIRCUIT MODULE

CROSS-REFERENCE TO RELATED APPLICATION

This application claims the benefit of Korean Application No. 2007-113642, filed Nov. 8, 2007 in the Korean Intellectual Property Office, the disclosure of which is incorporated herein by reference.

BACKGROUND OF THE INVENTION

1. Field of the Invention

Aspects of the present invention relate to a secondary battery, and more particularly, to a Positive Temperature Coefficient (PTC) device, a Protective Circuit Module (PCM) including the PTC device, and a secondary battery including the Protective Circuit Module (PCM).

2. Description of the Related Art

Among the types of prismatic secondary batteries, a bare cell generally comprises a can, electrode assemblies stored in the can, and a cap assembly connected to the can. Safety devices such as Positive Temperature Coefficient (PTC) devices and thermal fuses are installed outside bare cells. Each safety device is connected to at least one electrode terminal of a bare cell and the device blocks current from flowing outside the bare cell when the battery temperature rises, or the battery voltage falls below or rises above a reference voltage because of excessive charge and discharge. PTC devices prevent batteries from damage and deterioration.

PTC devices have recently been installed in Protective Circuit Modules (PCM's). Solder-based surface mount technologies can be used in order to mount the PTC device. For example, in a Protective Circuit Module (PCM) in which an electrical terminal having a conductive layer is exposed, the terminal of a PTC device is disposed on the electrical terminal having a conductive layer. The Protective Circuit Module (PCM) passes through a high temperature region. The conductive layer on the surface of the electrical terminal of the Protective Circuit Module (PCM) melts and then hardens so that the terminal of the PTC device is both electrically connected to the electrical terminal of the Protective Circuit Module (PCM) and is physically fixed thereto.

However, PTC devices are generally long with respect to the dimensions of a bare cell or PCM and both ends thereof in the length direction are formed as terminals in order to connect a PTC device to bare cells or Protective Circuit Modules (PCM's). Since only one terminal is disposed on the conductive layer of the electrical terminal of any one Protective Circuit Module (PCM), the original directions in which PTC devices are disposed may twist out of the designed orientation because of external forces during the manufacturing process or when the conductive layer melts in the high temperature region. This causes a problem in welding bare cells and the terminal as well as causes an external short-circuit since a portion of the PTC devices goes beyond the range of thickness of the bare cells.

Conventional PTC devices are connected to Protective Circuit Modules (PCM's) by soldering on surface mount devices (SMDs) using a surface mount technology (SMT). Although the SMT is used to mount PTC devices on SMDs by soldering, since one side of the PTC devices is fixed by a solder method but the other side thereof is not fixed by the solder method, PTC devices may sway or twist either during a mounting process or a subsequent process.

SUMMARY OF THE INVENTION

Aspects of the present invention provide a Positive Temperature Coefficient (PTC) device that does not sway or twist when it is being mounted on a Protective Circuit Module (PCM) or subsequently, the Protective Circuit Module (PCM) including the PTC device, and a secondary battery including the Protective Circuit Module (PCM).

Another aspect of the present invention provides a Positive Temperature Coefficient (PTC) device comprising: a PTC main body; a conductive layer contacting the upper surface of the PTC main body; a conductive plate contacting the lower surface of the PTC main body; and a support portion formed in the conductive plate, wherein the support portion has the same height as the upper side of the conductive layer substantially corresponding to the height between the conductive plate and an edge thereof upward.

The support portion is formed by bending one end of the conductive plate. The conductive plate comprises a lower end plate in which the PTC main body is placed, a higher end plate in which the support portion is formed, and a connecting portion for connecting the lower end plate and the higher end plate in a stepped manner. The conductive layer is a plate formed of nickel or nickel alloy.

Another aspect of the present invention provides a Protective Circuit Module (PCM) for a secondary battery comprising: a circuit board main body; a conductive pattern installed in the circuit board main body; and a PTC device comprising a PTC main body, a conductive layer contacting the upper surface of the PTC main body and electrically connecting to the conductive pattern, a conductive plate contacting the lower surface of the PTC main body, and a support portion formed as part of the conductive plate, wherein the support portion has the same height as the height of the conductive layer substantially corresponding to the height between the conductive plate and an edge thereof upward.

The conductive plate comprises a lower end plate in which the PTC main body is placed, a higher end plate in which the support portion is formed, and a connecting portion for connecting the lower end plate and the higher end plate in a stepped manner. An adhesive is coated on the lower surface of the circuit board main body that contacts the support portion. The adhesive may be a thermoplastic or thermosetting adhesive. A welding hole is formed in an area of the circuit board main body that overlaps the higher end plate.

The conductive layer of the PTC device in one aspect of the present invention constitutes a part of the PTC device and may be formed on the surface of the electrical terminal. Thereafter, the conductive layer is placed between the PTC main body and one electrical terminal of the whole Protective Circuit Module (PCM), and all become one integral piece.

Another aspect of the present invention provides a secondary battery comprising: i) a bare cell; ii) a Protective Circuit Module (PCM) electrically connected to the bare cell, wherein the Protective Circuit Module (PCM) comprises: a circuit board main body and a conductive pattern installed in the circuit board main body; and iii) a PTC device comprising a PTC main body, a conductive layer contacting the upper surface of the PTC main body and electrically connected to the conductive pattern, a conductive plate contacting the lower surface of the PTC main body, and a support portion formed in the conductive plate, wherein the support portion has the same height as the height of the conductive layer substantially corresponding to the height between the conductive plate and an edge thereof upward, and wherein one terminal of the bare cell is electrically connected to the conductive plate.

The one terminal of the bare cell is an electrode terminal, wherein a welding hole is formed in an area of the circuit board main body that overlaps the electrode terminal, and the electrode terminal and the conductive plate are combined in an area of the circuit board main body that overlaps the welding hole.

The conductive plate comprises a lower end plate in which the PTC main body is placed, a higher end plate in which the support portion is formed, and a connecting portion for connecting the lower end plate and the higher end plate in a stepped manner. The electrode terminal protrudes from the surface of the cap plate, the lower surface of the higher end plate and the upper end of the electrode terminal contact each other, and the step between the lower surface of the higher end plate and the lower surface of the lower end plate is smaller than the height of the electrode terminal that protrudes from the cap plate. An adhesive is coated on the lower surface of an insulating board that contacts the support portion.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures. Moreover, it is to be understood that where it is stated herein that one layer is "formed on" or "disposed on" a second layer, the first layer may be formed or disposed directly on the second layer or there may be an intervening layer between the first layer and the second layer. Further, as used herein, the term "formed on" is used with the same meaning as "located on" or "disposed on" and is not meant to be limiting regarding any particular fabrication process.

Figure 1:
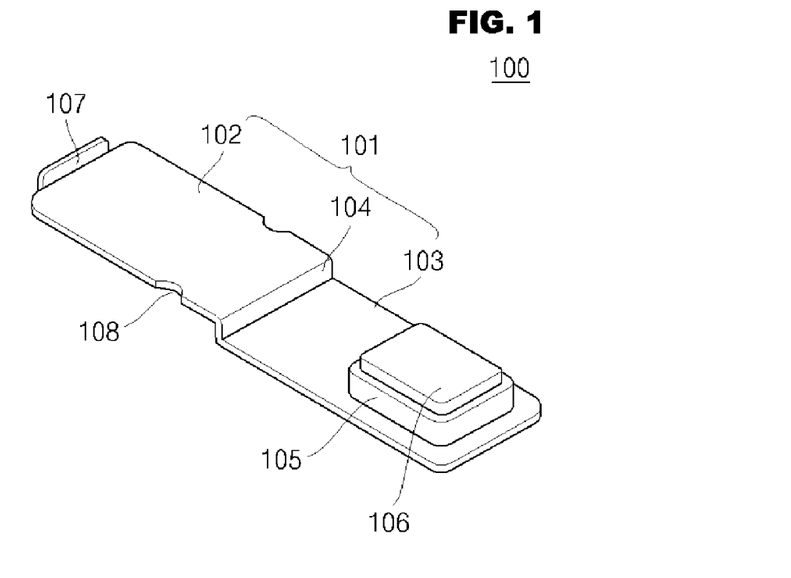
FIG. 1 is a perspective view of a Positive Temperature Coefficient (PTC) device according to an embodiment of the present invention.
Figure 2:
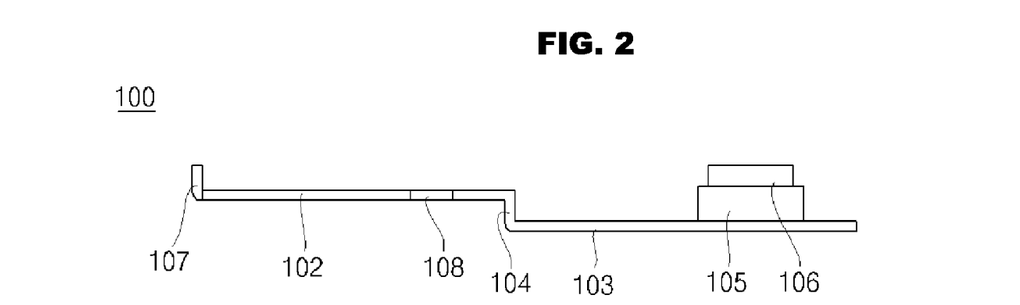
FIG. 2 is a side-sectional view of a PTC device according to the embodiment of FIG. 1.

FIG. 1 is a perspective view of a Positive Temperature Coefficient (PTC) device 100 according to an embodiment of the present invention. FIG. 2 is a side-sectional view of PTC device 100 according to the embodiment of FIG. 1. In FIGS. 1 and 2, PTC device 100 comprises a conductive plate 101, a PTC main body 105 formed on the conductive plate 101, and a support portion 107 formed at one end of the conductive plate 101.

The conductive plate 101 is formed of nickel and comprises a higher end plate 102, a lower end plate 103, and a connecting portion 104 for connecting the higher end plate 102 and the lower end plate 103 in a stepped manner. The higher end plate 102 is a conductive plate extending from the upper end of the connecting portion 104 formed in a vertical direction. The higher end plate 102 comprises the support portion 107 that is formed by bending upward the end of the higher end plate 102 that is opposite to the connecting portion 104. A recessed portion 108 is formed in the plane of the higher end plate 102 and is spaced apart by a predetermined distance from the connecting portion 104 between the connecting portion 104 and the support portion 107.

The lower end plate 103 is a conductive plate extending from the lower end of the connecting portion 104 formed in a parallel plane to the higher end plate 102 and extending away from the higher end plate 102 and the support portion 107. The PTC main body 105 and a conductive layer 106 formed on the upper surface of the PTC main body 105 are formed on the lower end plate 103. The height from the upper surface of the lower end plate 103 to the upper end of the support portion 107 corresponds to that from the lower surface of the PTC main body 105 to the upper surface of the conductive layer 106.

The connecting portion 104 connects the higher end plate 102 and the lower end plate 103 of the conductive plate 101 in a stepped manner so that the support portion 107 formed on one end of the high end plate 102 contacts a Protective Circuit Module (PCM) (see FIGS. 5 through 6B), and the conductive layer 106 formed on the lower end plate 103 is electrically connected to one end of the Protective Circuit Module (PCM).

The PTC main body 105 is disposed on the upper surface of the lower end plate 103. The conductive layer 106 is disposed on the PTC main body 105, and is electrically connected to one terminal formed on the Protective Circuit Module (PCM). Soldering of the conductive layer 106 to the Protective Circuit Module (PCM) will be described in detail in connection with the Protective Circuit Module (PCM) later. The conductive layer 106 may be one terminal 403 of the Protective Circuit Module (PCM) (see FIG. 5), preferably a plate formed of nickel or a nickel alloy connected to an electrical terminal or the like.

The support portion 107 is formed by bending an end of the higher end plate 102 upward such that the support portion 102 contacts the Protective Circuit Module (PCM). If there is no support portion 107, when devices are being connected to the Protective Circuit Module (PCM) during the assembly of a secondary battery, or during a subsequent assembly process, the PTC device 100 sways or twists. Therefore, the support portion 107 is formed at one end of the higher end plate 102, and that one end of the higher end plate 102 otherwise disposed away from the Protective Circuit Module (PCM) also contacts the Protective Circuit Module (PCM). Now at least one surface of the Protective Circuit Module (PCM) and the support portion 107 contact each other and are joined by an adhesive, thereby preventing the PTC device 100 from swaying or twisting during the process of mounting the PCT device on the surface of other devices or the process of assembling the secondary battery.

The recessed portions 108 are formed at both sides of the higher end plate 102 in the plane of the higher end plate 102, are typically semi-circular shaped and are at locations adjacent to the connecting portion 104. The recessed portions 108 are used to place a repair tool when the PTC device 100 moves or is repaired, and allow the PTC device 100 to be more easily mounted to the Protective Circuit Module (PCM) when the PTC device 100 moves or is repaired.

Figure 3:
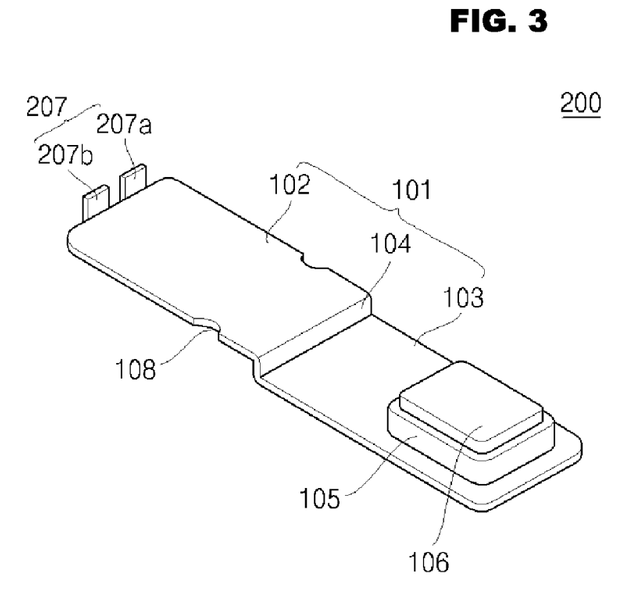
FIG. 3 is a perspective view of a PTC device according to another embodiment of FIG. 1.

PTC devices according to other embodiments of the present invention will now be described. FIG. 3 is a perspective view of a PTC device 200 according to another embodiment of the invention of FIG. 1. Referring to FIG. 3, the support portion 207 of the PTC device 200 is different from the support portion 107 of the PTC device 100 shown in FIGS. 1 and 2. In the present embodiment, the support portion 207 will be described. Same or similar portions as those of the embodiment of FIGS. 1 and 2 use the same reference numerals and thus detailed descriptions thereof are not repeated.

The support portion 207 is formed by bending an end of the higher end plate 102 upward. Grooves formed at a predetermined interval in the middle of the support portion 207 form support portions 207a and 207b that are separate from each other within the support 207. The support portion 207 can perform the same function as the support portion 107 that is formed in one piece. When the support portion 207 is fixed by applying an adhesive to the lower portion of a Protective Circuit Module (PCM) (again see FIGS. 5 through 6B), even if one of the support portions 207a and 207b is separated from the Protective Circuit Module (PCM), the support portion 207 can be more easily repaired since the other support portion remains fixed to the Protective Circuit Module (PCM).

Figure 4:
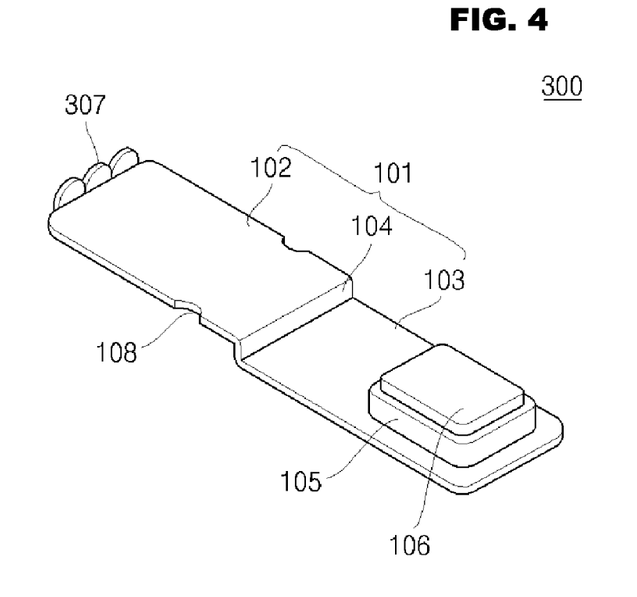
FIG. 4 is a perspective view of a PTC device according to yet another embodiment of FIG. 1.

FIG. 4 is a perspective view of a PTC device 300 according to yet another embodiment of the invention of FIG. 1. Referring to FIG. 4, a support portion 307 of the PTC device 300 is different from the support portion 107 of the PTC device 100 shown in FIGS. 1 and 2. In the present embodiment, the support portion 307 will be described. Same or similar portions as those of the embodiment of FIGS. 1 and 2 use the same reference numerals and thus detailed descriptions thereof are not repeated.

The support portion 307 is formed by bending an end of the higher end plate 102 upward. The support portion 307 may be in the shape of a plurality of semicircles or other shapes. The plurality of semicircular support portions 307 can perform the same function as the support portion 107 that is formed in one piece. When the support portion 307 is fixed by applying an adhesive to the lower portion of a Protective Circuit Module (PCM) (again see FIGS. 5-6B), the plurality of semicircular surfaces of the support portion 307 are connected to the Protective Circuit Module (PCM), thereby reducing each area of the support portion 307 connected to the Protective Circuit Module (PCM) and thus loads on the Protective Circuit Module (PCM) can be reduced.

Figure 5:
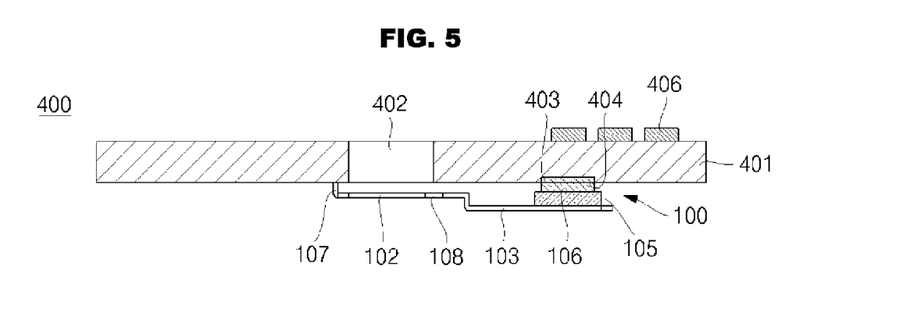
FIG. 5 is a cross-sectional view of a Protective Circuit Module (PCM) according to an embodiment of the present invention.
Figure 6A:
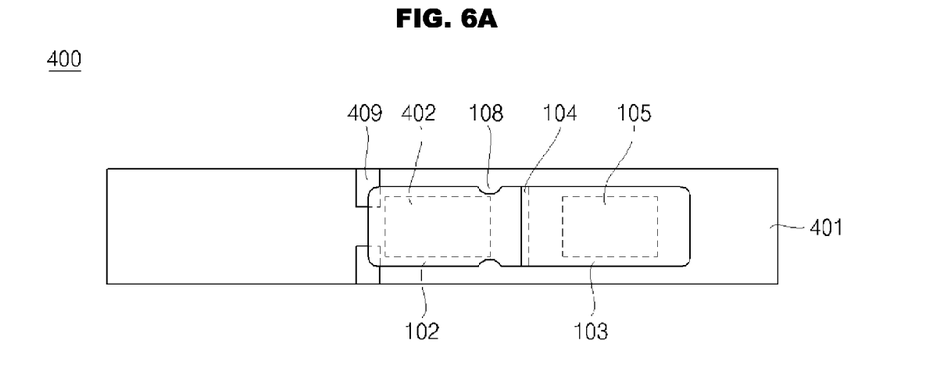
FIG. 6A is a bottom plan view of a Protective Circuit Module (PCM) according to the embodiment of FIG. 5.

A Protective Circuit Module (PCM) including the PTC device according to an embodiment of the present invention will be described. FIG. 5 is a cross-sectional view of a Protective Circuit Module (PCM) 400 according to an embodiment of the present invention. FIG. 6A is a bottom plan view of the Protective Circuit Module (PCM) according to the embodiment of FIG. 5. Referring to FIGS. 5 and 6A, the Protective Circuit Module (PCM) 400 comprises a circuit board main body 401, a conductive pattern 404 installed on the circuit board main body 401, and the PTC device 100.

A welding hole 402 is formed in the middle of the circuit board main body 401. At least one electrical device 406 such as a necessary chip or resistance is mounted on the upper portion of the circuit board main body 401. A first terminal 403 and the conductive pattern 404 are installed at the lower portion of the circuit board main body 401.

The welding hole 402 is formed at an area of the Protective Circuit Module (PCM) 400 that overlaps the higher end plate 102 of the PTC device 100. In more detail, the welding hole 402 is formed at the area overlapping the high end plate 102 from a direction perpendicular to a surface of the Protective Circuit Module (PCM) 400. The reason for the formation of the welding hole 402 will be described with reference to a secondary battery according to another embodiment of the present invention (See FIGS. 7 and 8).

The first terminal 403 is disposed on the lower surface of the Protective Circuit Module (PCM) 400 and is an electrode terminal. The first terminal 403 is electrically connected to the PTC device 100.

The conductive pattern 404 is formed on the circuit board main body 401. The conductive layer 106 formed on the upper portion of the PTC main body 105 and first terminal 403 are soldered to each other and thus the first terminal 403 and the PTC device 100 are electrically connected to each other.

A thermoplastic adhesive is applied on an adhesive layer 409 at both side ends of the Protective Circuit Module (PCM) 400 where the adhesive layer 409 contacts the support portion 107 as well as at the surface of the Protective Circuit Module (PCM) 400 that does not contact the support portion 107. The thermoplastic or thermosetting adhesive is not applied at a predetermined part in the middle of the adhesive layer 409. The conductive pattern 404 and the conductive layer 106 that are disposed on the first terminal 403 installed in the Protective Circuit Module (PCM) 400 contact each other. The conductive pattern 404 is melted by hot air or a heat lamp. Thereafter, when the high temperature is removed, the conductive pattern 404 becomes solid and the first terminal 403 and the conductive layer 106 are combined with each other, so that the PTC device 100 can be electrically and physically connected to the PCM 400. The adhesive or the adhesive layer 409, which is applied on the surface of the Protective Circuit Module (PCM) 400 and is initially hard, is melted by hot air or heat. The melted adhesive layer 409 that contacts the support portion 107 touching the Protective Circuit Module (PCM) 400 hardens when the high temperature is removed, thereby fixing the support portion 107. Therefore, the higher end plate 102 is fixed to the Protective Circuit Module (PCM) 400 and thus the PTC device 100 is unlikely to sway or twist. Although a thermoplastic (reversible) adhesive is described in the above embodiments, the adhesive layer 409 can be formed by laminating a thermosetting adhesive using various methods.

Figure 6B:
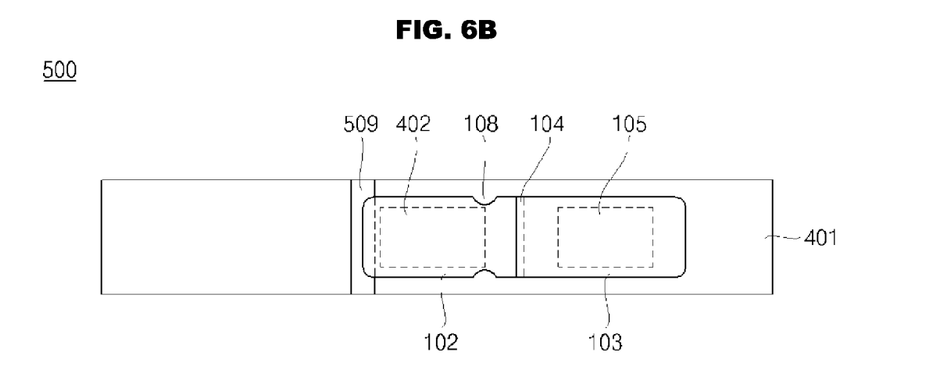
FIG. 6B is a plan view of a Protective Circuit Module (PCM) according to another embodiment of FIG. 5.

A Protective Circuit Module (PCM) including a PTC device according to another embodiment of the present invention will now be described. FIG. 6B is a plan view of a Protective Circuit Module (PCM) 500 according to another embodiment of the invention of FIG. 5. The PTC device and the PCM of the present embodiment are different from the PTC device described with reference to FIGS. 1 to 4 and the PCM of FIGS. 5 and 6A only in terms of the adhesive layer 409 on which an adhesive for adhering the support portion 107 to the Protective Circuit Module (PCM) 400 is applied. Therefore, in the present embodiment, only an adhesive layer 509 that is disposed on the support portion 107 is described.

Same or similar portions as those of the embodiment of FIGS. 1 through 6A use the same reference numerals and thus detailed descriptions thereof are not repeated.

Referring to FIGS. 5 and 6B, the adhesive layer 509 is formed by applying a thermoplastic adhesive on a portion of the Protective Circuit Module (PCM) 500 that contacts the support portion 107 and the other surface of the Protective Circuit Module (PCM) 500 that does not contact the support portion 107. The conductive pattern 404 and the conductive layer 106 that are disposed on the first terminal 403 installed in the Protective Circuit Module (PCM) 400 contact each other. The conductive pattern 404 is melted by hot air or a heat lamp. Thereafter, when the high temperature is removed, the conductive pattern 404 becomes solid and the first terminal 403 and the conductive layer 106 are combined with each other, so that the PTC device 100 can be electrically and physically connected to the PCM 500. The adhesive or the adhesive layer 509, which is applied on the surface of the Protective Circuit Module (PCM) 500 and is initially hard, is melted by hot air or heat. The melted adhesive layer 509 that contacts the support portion 107 touching the Protective Circuit Module (PCM) 500 hardens when the high temperature is removed, thereby fixing the support portion 107. Therefore, the higher end plate 102 is fixed to the Protective Circuit Module (PCM) 500 and thus the PTC device 100 does not sway or twist. Compared to the PTC device 100 that is fixed to the Protective Circuit Module (PCM) 500 by applying the adhesive only on both ends of the support portion 107 (FIG. 6A), the PTC device 100 of FIG. 6B is more stably fixed to the Protective Circuit Module (PCM) 200 by applying the adhesive entirely on the support portion 107 and thus is unlikely to sway or twist. As with the previous embodiment, although a thermoplastic (reversible) adhesive is described in the above embodiments, the adhesive layer 509 can be formed by laminating a thermosetting adhesive using various methods.

Figure 7:
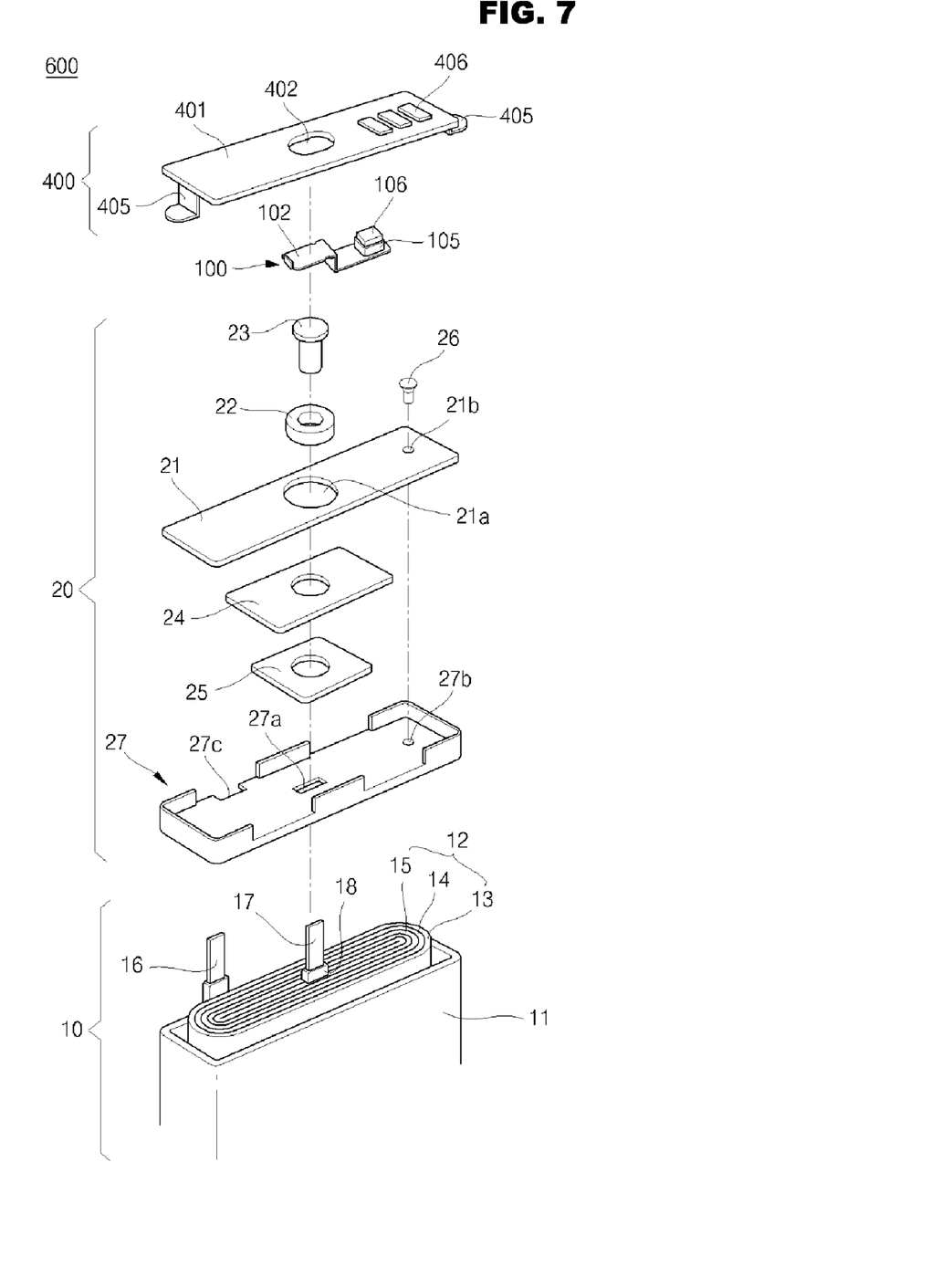
FIG. 7 is an exploded perspective view of a secondary battery according to an embodiment of the present invention.
Figure 8:
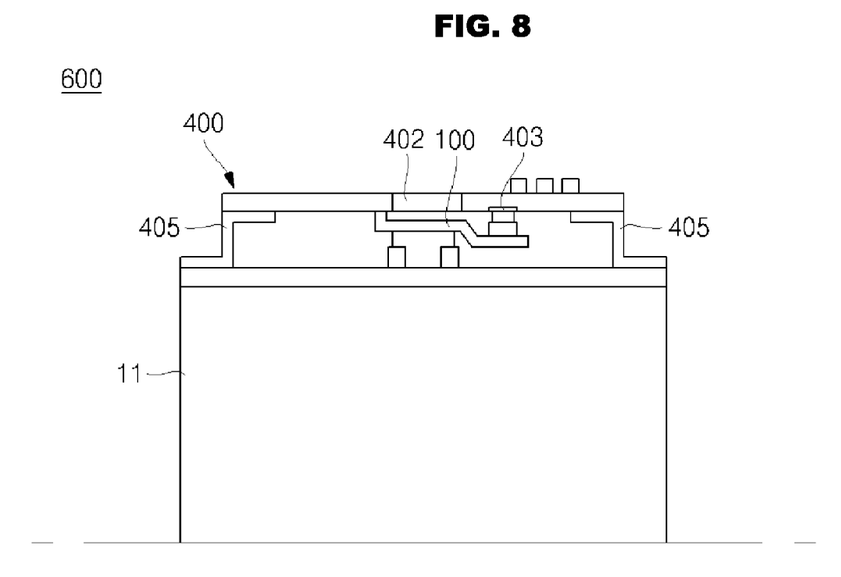
FIG. 8 is a front cross-sectional view of a secondary battery according to the embodiment of FIG. 7.

A secondary battery including a Protective Circuit Module (PCM) according to an embodiment of the present invention will be described with reference to FIGS. 7 and 8. FIG. 7 is an exploded perspective view of a secondary battery according to an embodiment of the present invention. FIG. 8 is a front cross-sectional view of a secondary battery according to the embodiment of FIG. 7.

Referring to FIGS. 7 and 8, the secondary battery 600 comprises a bare cell 10, a cap assembly 20 electrically connected to the bare cell 10, the PTC device 100 connected to an electrode terminal 23 included in the cap assembly 20, and the Protective Circuit Module (PCM) 400 electrically connected to the PTC device 100.

The bare cell 10 comprises a can 11, an electrode assembly 12 stored in the can 11, a positive electrode 13, a separator 14 and a negative electrode 15 forming the electrode assembly 12, a positive tab 16 electrically connected to and extending from the positive electrode 13, a negative tab 17 electrically connected to and extending from the negative electrode 15, and insulating tape 18 for preventing the positive electrode 13 and the negative electrode 15 from being short-circuited.

The can 11 is a metal container formed with a prismatic shape and open at one end, and is formed using a processing method such as deep drawing or the like. Therefore, the can 11 can function as a terminal. The can 11 may be formed of conductive aluminum or aluminum alloy. The can 11 is a container for the electrode assembly 12 and electrolyte. The opening of the can 11 for putting in the electrode assembly 12 is sealed by the cap assembly 20.

In the electrode assembly 12 the positive electrode 13 and the negative electrode 15 are formed in wide plates in order to increase electrical capacity, the separator 14 is then laminated between the positive electrode 13 and the negative electrode 15 to insulate both electrodes, and the electrode assembly 12 is formed in a coil to form a shape like a jelly roll. The positive electrode 13 and the negative electrode 15 can be formed respectively by coating two collectors each formed of aluminum foil and copper with lithium cobalt oxide that is a positive electrode active material and carbon that is a negative electrode active material.

The separator 14 is formed of polyethylene, polypropylene, a co-polymer of polyethylene and polypropylene, or other similar polymers. It is advantageous that the separator 14 is wider than the positive electrode 13 and the negative electrode 15 in order to prevent the electrode plates from short-circuiting. The positive tab 16 and the negative tab 17 that are connected to each electrode are electrically connected to the positive electrode 13 and negative electrode 15 respectively and extend from the electrode assembly 12. An insulating tape 18 is wound around the boundary portion of the electrode assembly 12 from which the positive tab 16 and the negative tab 17 extend in order to prevent the electrode plates of the positive electrode 13 and the negative electrode 15 from short-circuiting.

The cap assembly 20 comprises a cap plate 21, a gasket 22, an electrode terminal 23, an insulating plate 24, a terminal plate 25, an insulating case 27, and a plug 26. The cap plate 21 is formed to include a terminal port hole 21a and an electrolyte injection hole 21b. When the electrode terminal 23 is inserted into the cap plate 21, in order to insulate the electrode terminal 23 and the cap plate 21, the circular gasket 22 for storing the electrode terminal 23 is placed on the exterior surface of the electrode terminal 23 through the terminal port hole 21a. The electrolyte injection hole 21b is formed at one end of the cap plate 21 to inject electrolyte into the can 11, and is sealed with the plug 26 after electrolyte is injected into the can 11.

The insulating plate 24 is disposed at the lower surface of the cap plate 21. The terminal plate 25 is installed at the lower surface of the insulating plate 24. The insulating plate 24 insulates the cap plate 21 and the terminal plate 25. The terminal plate 25 is connected to the lower portion of the electrode terminal 23. The negative electrode 15 of the electrode assembly 12 is electrically connected to the electrode terminal 23 via the negative tab 17 and the terminal plate 25. The positive electrode 13 of the electrode assembly 12 with the positive tab 16 is welded to the cap plate 21 or the can 11.

The insulating case 27 may be further disposed in the lower portion of the terminal plate 25. The insulating case 27 comprises a negative tab perforation portion 27a, a positive tab perforation portion 27c, and an electrolyte injection hole 27b. In another embodiment, the positions of the positive electrode 13 and the negative electrode 15 may be reversed.

The plug 26 is used to seal the electrolyte injection hole 21b formed in the cap plate 21 after injecting electrolyte through the electrolyte injection hole 21. Instead of the plug 26, a ball or other device can be used to seal the electrolyte injection hole 21b after being pressed into place.

In this way, a prismatic bare cell battery is completely formed. The prismatic bare cell battery is connected to the Protective Circuit Module (PCM) 400 so that the electrode terminal 23 of the prismatic bare cell battery can contact the higher end plate 102 of the PTC device 100 shown in FIG. 5 or FIGS. 6A and 6B.

The lower surface of the higher end plate 102 of the PTC device 100 is connected to the electrode terminal 23 of the bare cell battery. The PTC main body 105 is formed on the upper surface of the lower end plate 103 of the PTC device 100 and the conductive layer 106 is formed on the upper portion of the PTC main body 105 so that the conductive layer 106 is combined with the first terminal of the Protective Circuit Module (PCM) 400. The connection between the higher end plate 102 of the PTC device 100 and the electrode terminal 23 of the bare cell battery is made by welding. The welding is made by flowing current through the contact surface between the higher end plate 102 and the electrode terminal 23 of the bare cell battery and forming a welding portion at a part of the contact surface by using a resistance welding bar downward via the welding hole 402 formed on the circuit board main body 401. The conductive layer 106 and the first terminal of the Protective Circuit Module (PCM) 400 are combined with each other after the conductive pattern installed on the circuit board main body 401 is melted at a high temperature and hardens when the high temperature is removed.

The cap plate 21 serves as another electrode terminal of the bare cell battery. Each of connection leads 405 fixed to both lower ends of the circuit board main body 401 is connected to both ends of the cap plate 21 in the length direction. At least one of the connection leads 405 is connected to a second terminal of the lower surface of the circuit board main body 401, so that the cap plate 21 is electrically connected to the second terminal of the lower surface of the circuit board main body 401. Thus, the Protective Circuit Module (PCM) 400 is electrically connected to the bare cell.

The PTC device 100 is placed in the current circulation path between the Protective Circuit Module (PCM) 400 and the bare cell to operate when it receives heat coming from the bare cell battery or outside, and blocks current flow to prevent a safety accident such as an explosion or ignition of a battery or the like.

According to aspects of the present invention, a support portion is formed at an end of a conductive plate section of a PTC device and is fixed to a Protective Circuit Module (PCM) when a conductive layer disposed on the upper layer of the PTC device is surface mounted. This prevents a defective connection to an electrical terminal or a short circuit from outside due to a PTC device that may have moved or twisted.

The support portion is more easily fixed to the Protective Circuit Module (PCM) by using an adhesive that has been previously coated on the Protective Circuit Module (PCM), thereby preventing the PTC device from swaying or twisting.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A Positive Temperature Coefficient (PTC) device comprising:
   a PTC main body;
   a conductive layer contacting the upper surface of the PTC main body;
   a conductive plate contacting the lower surface of the PTC main body; and
   a support portion formed in the conductive plate, wherein the support portion has the same height as the height of the conductive layer substantially corresponding to the height between the conductive plate and an edge thereof upward,
   wherein the conductive plate comprises a lower end plate in which the PTC main body is placed, a higher end plate in which the support portion is formed, and a connecting portion connecting the lower end plate and the higher end plate in a stepped manner.

2. The PTC device of claim 1, wherein the support portion is formed by curving one end of the conductive plate.

3. The PTC device of claim 1, wherein the conductive layer is a plate formed of nickel or nickel alloy.

4. A Protective Circuit Module (PCM) for a secondary battery comprising:
   a circuit board main body;
   a conductive pattern installed in the circuit board main body; and
   a PTC device comprising a PTC main body, a conductive layer contacting the upper surface of the PTC main body and electrically connecting to the conductive pattern, a conductive plate contacting the lower surface of the PTC main body, and a support portion formed in the conductive plate, wherein the support portion has the same height as the height of the conductive layer substantially corresponding to the height between the conductive plate an edge thereof upward,
   wherein the conductive plate comprises a lower end plate in which the PTC main body is placed, a higher end plate in which the support portion is formed, and a connecting portion connecting the low end plate and the high end plate in a stepped manner.

5. The Protective Circuit Module (PCM) of claim 4, wherein an adhesive is coated on the lower surface of the circuit board main body that contacts the support portion.

6. The Protective Circuit Module (PCM) of claim 5, wherein the adhesive is a thermoplastic or thermosetting adhesive.

7. The Protective Circuit Module (PCM) of claim 4, wherein a welding hole is formed in an area of the circuit board main body that overlaps the higher end plate.

8. A secondary battery comprising:
   a bare cell; and
   a Protective Circuit Module (PCM) electrically connected to the bare cell,
   wherein the Protective Circuit Module (PCM) further comprises:
   a circuit board main body;
   a conductive pattern installed in the circuit board main body; and
   a Positive Temperature Coefficient Device (PTC) device further comprising a PTC main body, a conductive layer contacting the upper surface of the PTC main body and electrically connecting to the conductive pattern, a conductive plate contacting the lower surface of the PTC main body, and a support portion formed in the conductive plate, wherein the support portion has the same height as the height of the conductive layer substantially corresponding to the height between the conductive plate and an edge thereof upward, and one terminal of the bare cell is electrically connected to the conductive plate.

9. The secondary battery of claim 8, wherein the first terminal of the bare cell is an electrode terminal,
   wherein a welding hole is formed in an area of the circuit board main body that overlaps the electrode terminal, and the electrode terminal and the conductive plate are combined in an area of the circuit board main body that overlaps the welding hole.

10. The secondary battery of claim 8, wherein the conductive plate comprises a lower end plate in which the PTC main body is placed, a higher end plate in which the support portion is formed, and a connecting portion connecting the lower end plate and the higher end plate in a stepped manner.

11. The secondary battery of claim 8, wherein the electrode terminal protrudes from the surface of a cap plate, the lower surface of the higher end plate and the upper end of the electrode terminal contact each other, and a step between the lower surface of the higher end plate and the lower surface of the lower end plate is smaller than a height of the electrode terminal that protrudes from the cap plate.

12. The secondary battery of claim 8, wherein an adhesive is coated on the lower surface of an insulating board that contacts the support portion.

13. The PTC device of claim 2, wherein the support portion is a solid piece.

14. The PTC device of claim 13, wherein the solid piece is formed into segments by grooves.

15. The PTC device of claim 2, wherein the support piece comprises a plurality of support portions.

16. The PTC device of claim 15, wherein the support pieces are semicircular in shape.

* * * * *